United States Patent [19]

Okabe

[11] Patent Number: 4,489,805

[45] Date of Patent: Dec. 25, 1984

[54] UNIVERSAL LEVER APPARATUS FOR HYDRAULIC CONSTRUCTION MACHINE

[75] Inventor: Nobuya Okabe, Tsuchiura, Japan

[73] Assignee: Hitachi Construction Machinery Co., Ltd., Tokyo, Japan

[21] Appl. No.: 486,117

[22] Filed: Apr. 18, 1983

[30] Foreign Application Priority Data

Apr. 21, 1982 [JP] Japan .................................. 57-65401

[51] Int. Cl.[3] .............................................. B60K 28/00

[52] U.S. Cl. ................................ 180/271; 74/471 XY; 74/483 R; 180/333

[58] Field of Search ...................... 180/315, 333, 6.48, 180/268, 271, 286; 74/471 XY, 471 R, 483 R

[56] References Cited

U.S. PATENT DOCUMENTS

| | | | |
|---|---|---|---|
| 3,811,020 | 5/1974 | Johnson et al. | 180/271 |
| 4,069,900 | 1/1978 | Stamate | 180/271 |
| 4,388,980 | 6/1983 | Vig et al. | 180/271 |

FOREIGN PATENT DOCUMENTS

| | | | |
|---|---|---|---|
| 54-68331 | 5/1979 | Japan . | |
| 2099906 | 12/1982 | United Kingdom | 74/471 XY |

*Primary Examiner*—Joseph F. Peters, Jr.
*Assistant Examiner*—D. Lynn Fugate
*Attorney, Agent, or Firm*—Antonelli, Terry & Wands

[57] ABSTRACT

A universal lever apparatus having a first rod and a second rod each for actuating an operated member, an operation lever connected to the first rod and the second rod and pivotally movable in a first direction for moving the first rod and in a second direction for moving the second rod, and lock mechanism for locking the operation lever. The lock mechanism includes a manually operated device operatively connected to the operation lever for pivotally moving the operation lever to a rearward position in which the operation lever does not interfere with movement of a driver without causing effective movements of the first and second rods, the manually operated device being movable between an unlock position in which the pivotal movement of the operation lever causes the effective movement of the first and second rods and a lock position in which the operation lever is located in the rearward position. The lock mechanism further includes elements operatively associated with the manually operated device for resiliently holding the manually operated device in the unlock position and the lock position, and elements for restraining the operation lever to keep same from pivotally moving in the first and second directions when the manually operated device is in the lock position and the operation lever is in the rearward position.

10 Claims, 5 Drawing Figures

UNIVERSAL LEVER APPARATUS FOR HYDRAULIC CONSTRUCTION MACHINE

BACKGROUND OF THE INVENTION

This invention relates to universal lever apparatus having an operation lever pivotally movable in two directions, and more particularly to a universal lever apparatus in which lock means is provided for locking the operation lever to keep same from pivotally moving in the two directions.

Hydraulic construction machines, such as hydraulic excavators, usually have a pair of universal lever apparatus located near the right and left sides of a drivers seat in a cab, and each universal lever apparatus is manipulated by the driver for operating working elements such as a swing, travel members, etc.

One type of universal lever apparatus known in the art comprises an operation lever pivotally movable in a first direction and a second direction, a first rod connected to the operation lever for movement to actuate an operated member as the operation lever moves in the first direction, and a second rod connected to the operation lever for movement to actuate another operated member as the operation lever moves in the second direction. The operated member actuated by the first rod may be an operated section of a directional control valve for hydraulically driving a working element, and the operated member actuated by the second rod may be an operated section of another directional control valve for hydraulically driving another working element. Thus, the driver can operate two working elements by manipulating the operation lever of one of the pair of universal lever apparatus.

The aforesaid type of universal lever apparatuses have hitherto been usually located in front of the right and left sides of the driver's seat in a position in which the operation lever of each universal lever apparatus does not interfere with the movement of the driver in entering or leaving the cab.

Proposals have in recent years been made to arrange the universal lever apparatuses of the aforesaid type in a position adjacent to the right and left sides of the driver's seat. When the universal lever apparatuses are arranged in such a position, the operation levers of universal lever apparatuses will be located sideways of the driver's seat. If the operation levers are located in this position, one of them would interfere with the movement of the driver in entering and leaving the cab, making it impossible for the driver to act nimbly. An additional disadvantage would be that if the hand or body of the driver were inadvertently brought into contact with the operation lever, there would be the risk that the operation lever might be actuated by mistake, raising a problem with regard to the safety of operation.

Japanese Utility Model Laid-Open No. 68331/79 discloses a universal lever apparatus of the aforesaid type which is provided with a lock mechanism for locking the operation lever in a neutral position to keep same from pivotally moving in two directions. The provision of this lock mechanism would have the effect of avoiding unintentional movement of the operation lever even if the driver touches the operation lever when entering or leaving the cab. However, this lock mechanism is intended merely to lock the operation lever in its neutral position and does not essentially provide a solution to the problem that the operation lever interferes with the movement of the driver and prevents him from acting nimbly when he enters or leaves the cab.

Additionally the lock mechanism is not adapted to prevent the driver from forgetting to lock the operation lever before leaving the cab, and therefore the operation lever might be moved by mistake when the driver enters or leaves the cab.

SUMMARY OF THE INVENTION

An object of this invention is to provide a universal lever apparatus provided with lock means for locking an operation lever in a position in which the operation lever does not interfere with the movement of the driver when the drive enters or leaves the cab or the operation lever need not be manipulated.

Another object is to provide a universal lever apparatus provided with lock means for an operation lever which is arranged in a position such that the driver would be reminded not to forget to lock the operation lever in leaving the cab, thereby ensuring that the operation lever is not unintentionally manipulated.

According to the invention, there is provided a universal lever apparatus comprising a first rod and a second rod each for actuating an operated member, an operation lever connected to the first rod and the second rod and pivotally movable in a first direction for moving the first rod and in a second direction for moving the second rod, and lock means for locking the operation lever, the lock means comprising manually operated means operatively connected to the operation lever for pivotally moving the operation lever to a rearward position in which the operation lever does not interfere with movement of a driver without causing effective movements of the first and second rods, said manually operated means being movable between an unlock position in which the pivotal movement of the operation lever causes the effective movement of the first and second rods and a lock position in which the operation lever is located in the rearward position, and means associated with the manually operated means for resiliently holding said manually operated means in the unlock position and the lock position, and means for restraining the operation lever to keep same from pivotally moving in the first and second directions when the manually operated means is in the lock position and the operation lever is in the rearward position.

In one preferred embodiment, the manually operated means may comprise pivotal connection means for flexingly dividing the first rod into rod sections, a link means pivotally connected to the pivotal connection means, and manually operated lock lever means mounted for pivotal movement and pivotally connected to the link means, the first rod being flexed at the pivotal connection means through the link means to pivotally move the operation lever in the first direction toward the restraining means when the lock lever means is pivotally moved from the unlock position to the lock position.

The manually operated means may further comprise a guide roller rotatably supported by the pivotal connection means, and a guide channel mounted for receiving the guide roller to regulate its movement when the first rod is flxed. The guide channel may be in the form of an arc centered at an output end of the first rod.

In the preferred embodiment, the manually operated means may comprise a hand lever, the hand lever being located such that the hand lever is in a position to block a passage for the driver through which he moves in entering or leaving a cab when the manually operated means is in the unlock position and the hand lever is in a position to open the passage when the manually operated means is in the lock position.

DESCRIPTION OF THE PREFERRED EMBODIMENT

Figure 1:
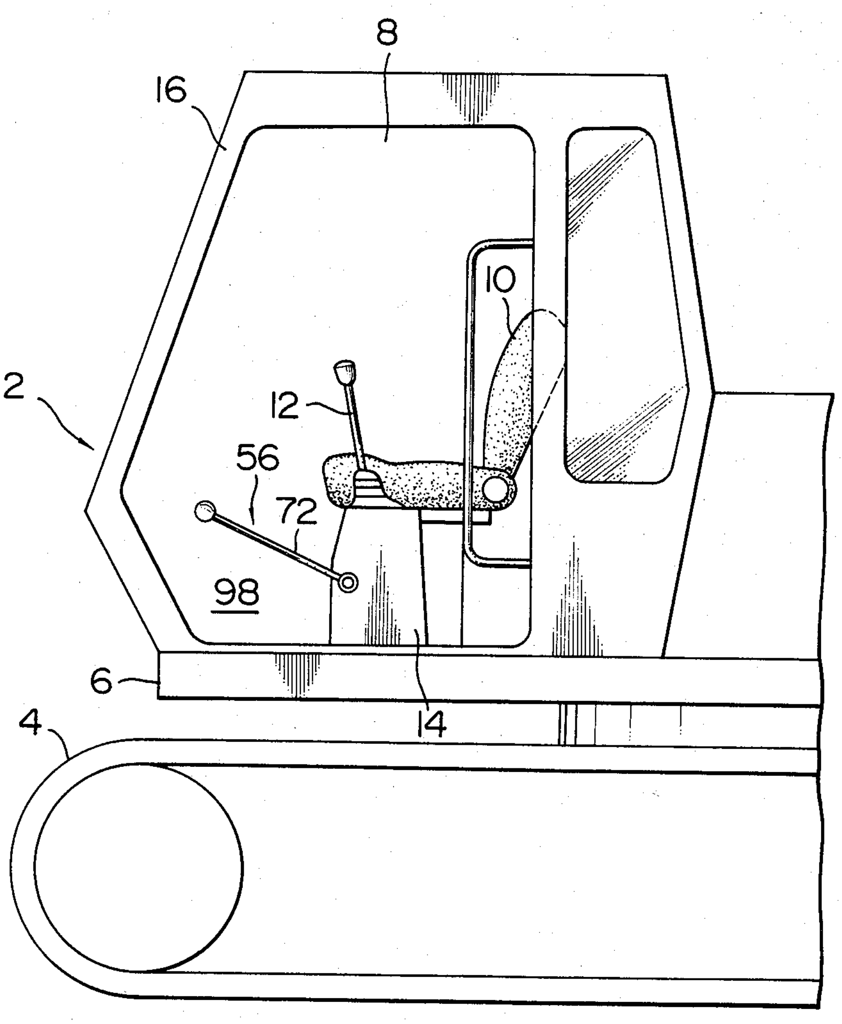
FIG. 1 is a side view of the essential portions of a hydraulic excavator incorporating therein the universal lever apparatus comprising a preferred embodiment of the invention.

Referring to FIG. 1, a hydraulic excavator 2 in which the universal lever apparatus according to the invention is incorporated comprises a travel device 4 having a crawler belt, etc., and a swing 6 supported on the travel device 4. A driver's cab 8 is located on the swing 6 and has a seat 10, and a universal lever apparatus 14 having an operation lever 12 comprising a preferred embodiment of the invention is located on one side of the driver's seat 10. The operation lever 12 is manipulated by the driver when working elements are actuated, that is when the travel device 4 is actuated for travelling movement or the swing 6 is actuated for swinging movement, for example. A door frame 16 has a door, not shown, hingedly connected thereto. Other working elements, such as a boom, an arm, etc., are omitted in the interest of brevity.

Referring to FIGS. 2-5, the universal lever apparatus 14 comprises, in addition to the operation lever 12, a first rod 20 for actuating an operated member, and a second rod 22 for actuating another operated member. The operation lever 12 is connected to the first rod 20 and the second rod 22 and pivotally movable in a first direction or X—X' direction for moving the first rod 20 vertically and in a second direction or Y—Y' direction for moving the second rod 22 vertically. The operated member actuated by the first rod 20 may, for example, be an operated section of a directional control valve for hydraulically actuating the travel device 4, and the operated member actuated by the second rod 22 may, for example, be an operated section of a directional control valve for hydraulically actuating the swing 6. Thus, the universal lever apparatus 14 is capable of actuating the travel device 4 and the swing 6 when the single operation lever 12 is manipulated.

Figure 3:
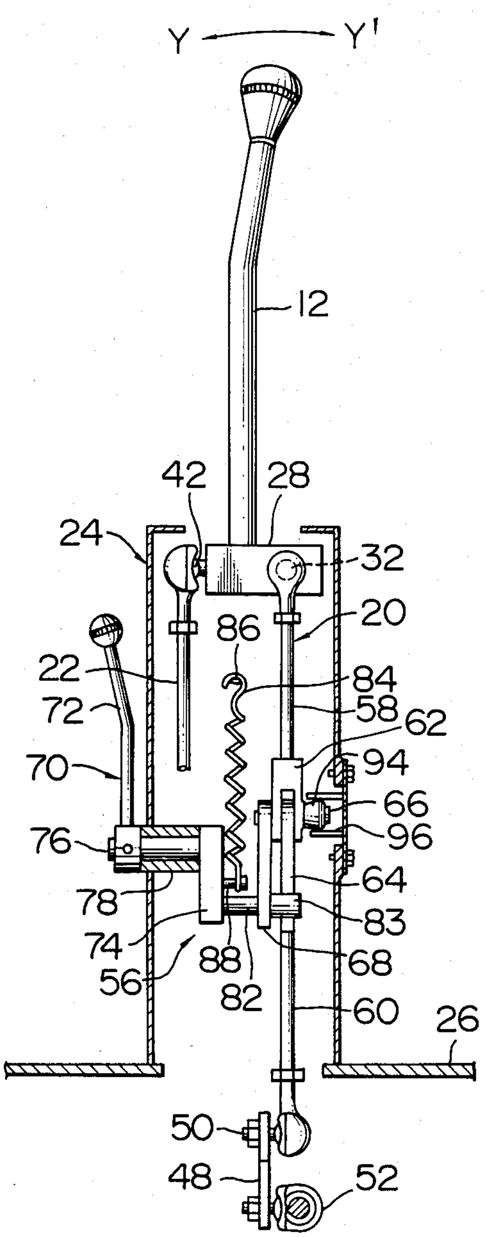
FIG. 3 is a sectional view taken along the line III—III in FIG. 2.
Figure 4:
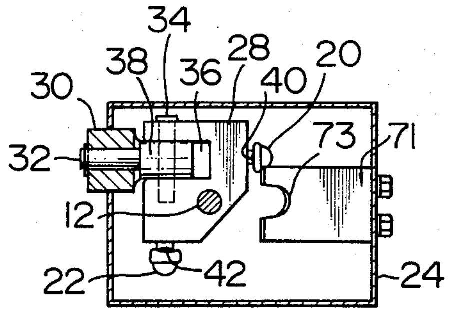
FIG. 4 is a top plan view as seen in the direction of arrows IV—IV in FIG. 2.

The first rod 20 and the second rod 22 are located in a stand 24 constituting a shell and located in an upright position on a floor 26 of the cab 8. The operation lever 12 has at its lower end portion a block 28 received in a boss 30 secured to the stand 24 and pivotally supported by pins 32 and 34. The pin 32 includes, as shown in FIG. 4, a projection 38 located in a hollow portion 36 formed in the body of the block 28 and is pivotally supported in the boss 30. The pin 34 interconnects, as shown in FIG. 4, the block 28 and the projection 38 in a manner to allow them to move in mutual pivotal movement. Thus, the block 28 can pivotally move about the center axis of the pin 34 in the X—X' direction in FIG. 2 and about the center axis of the pin 32 in the Y—Y' direction in FIG. 3.

The first rod 20 is pivotally connected to one side of the block 28 through a ball joint 40, and the second rod 22 is pivotally connected through a ball joint 42 to another side of the block 28 or a side thereof which is substantially at right angle to the side to which the first rod 20 is connected.

The floor 26 has secured thereto a block 44 which in turn has secured thereto a pin 46 pivotally supporting a two-arm lever 48 including one arm pivotally connected to a lower end portion of the first rod 20 through a pin 50 and the other arm pivotally connected through a pin 54 to a rod 52 connected to the operated member. Although a lower end portion of the second rod 22 and members attached thereto are omitted in the interest of brevity, members similar to the pin 50, lever 48, block 44, pin 46, rod 52 and pin 54 are provided to the lower end portion of the second rod 22.

The reference numeral 56 designates a lock mechanism for the operation lever according to the invention. To constitute the lock mechanism, the first rod 20 preferably comprises a first rod section 58 and a second rod section 60. A lower end 62 of the first rod section 58 and an upper end 64 of the second rod section 60 are pivotally connected together by a pin 66 which, together with the lower and upper ends 62 and 64, constitutes pivotal connection means for flexingly dividing the first rod 20 into the first and second rod sections 58 and 60. The pin 66 has pivotally connected thereto one end of a link 68 pivotally connected at the other end to manually operated lock lever means 70 which is mounted for pivotal movement by the stand 24.

Figure 2:
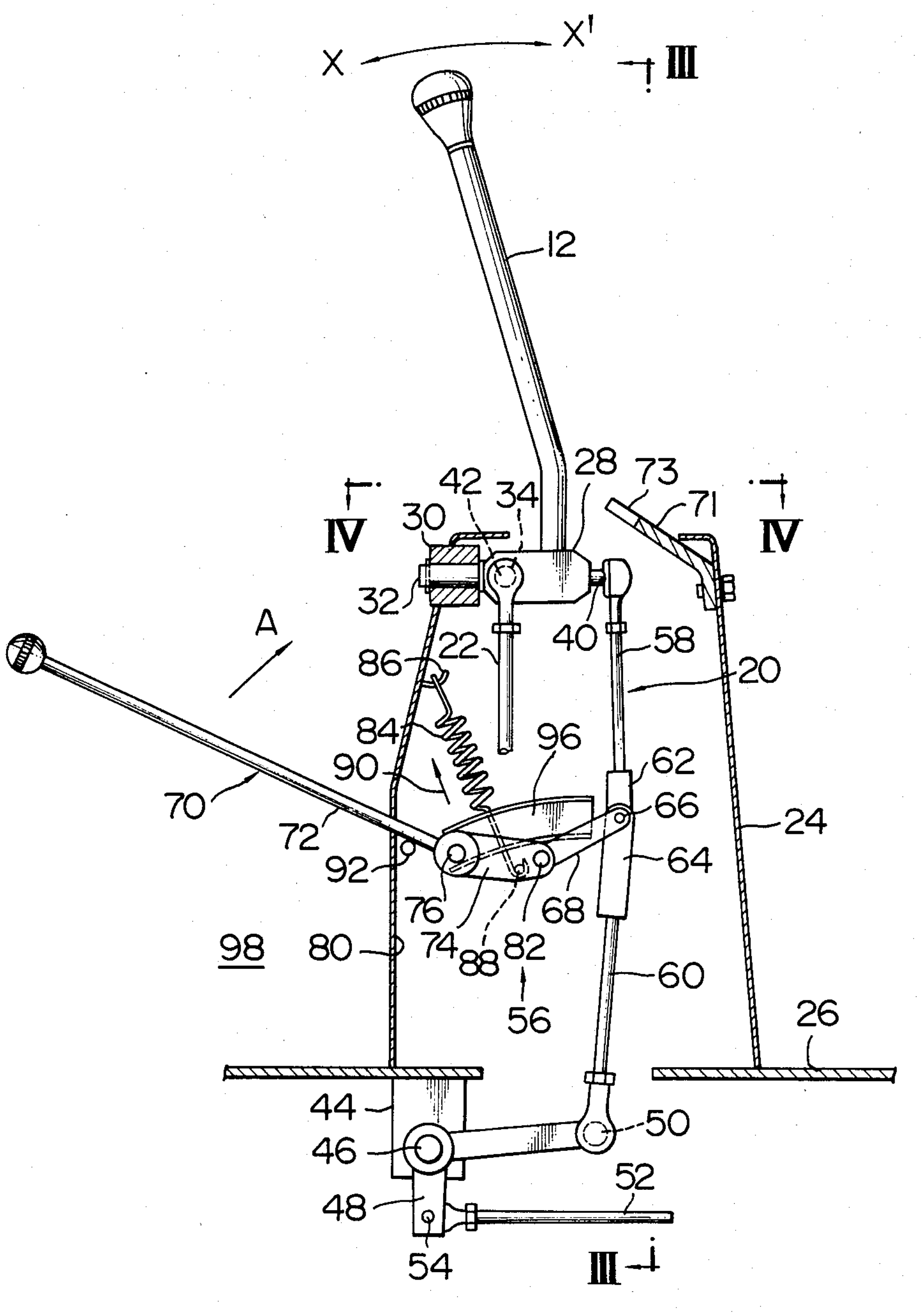
FIG. 2 is a vertical sectional side view of the universal lever apparatus shown in FIG. 1, showing the lock mechanism in the unlock position.
Figure 5:
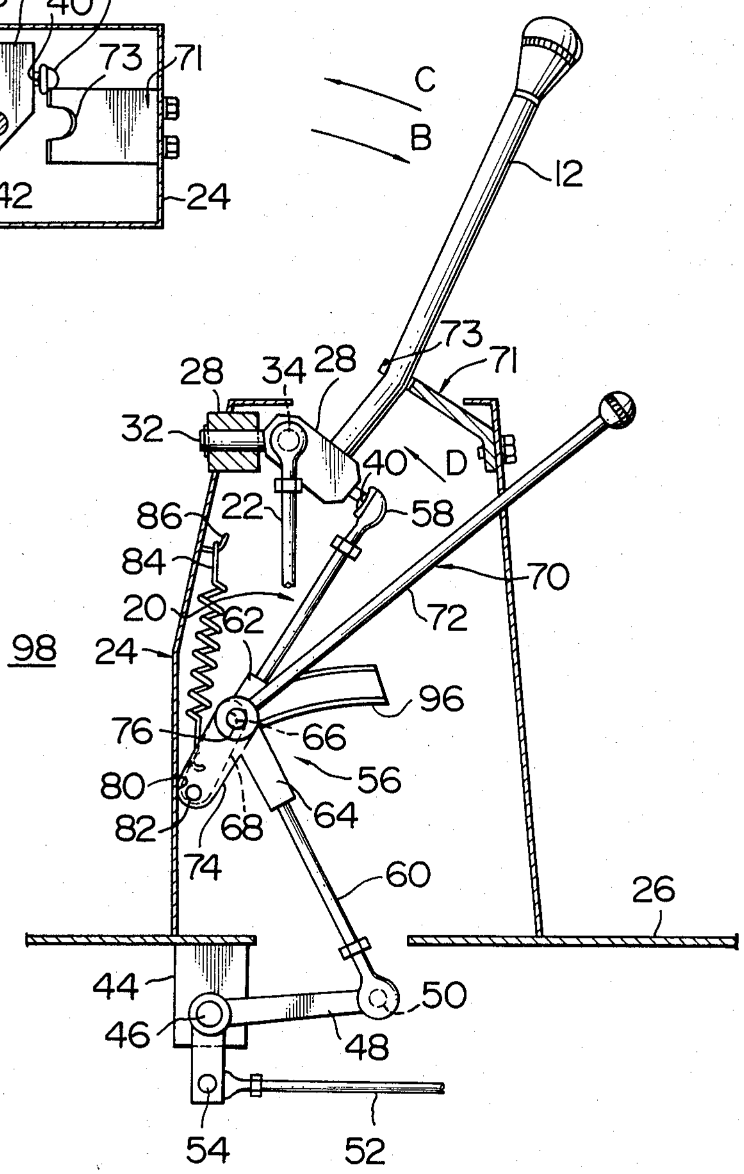
FIG. 5 is a vertical sectional view similar to FIG. 2 but showing the lock mechanism in the lock position.

When the lock lever means 70 is moved from an unlock position shown in FIG. 2 to a lock position shown in FIG. 5, the first rod 20 is flexed at the pivotal connection means 62, 64 and 66, and the operation lever 12 is pivotally moved in a first direction X' toward an engaging slot 73 formed in a guide plate 71 secured to the stand 24 (see FIG. 4). To this end, the lock lever means 70 preferably comprises a hand lever 72 and an extending portion 74 rigidly connected together at bases by a pin 76 constituting the pivot of the lock lever means 70. The pin 76 is pivotally connected, as shown in FIG. 3, to a boss 78 secured to the stand 24. As shown in FIG. 2, one wall surface portion of the stand 24 constitutes a stopper 80 engaged by the extending portion 74 to limit a clockwise movement of the lock lever means 70. The link 78 pivotally connected at one end to the pin 66 which constitutes the pivotal connection means of the first rod 20 is pivotally connected at the other end to a forward end of the extending portion 74 through a pin 82. A coil spring 84 is connected at one end to a projection 86 on the stand 24 and at the other end to a projection 88 on the extending portion 74 for urging the extending portion 74 to move in the direction of an arrow 90 in FIG. 2. A stopper 92 is secured to the stand 24 to limit the counterclockwise movement of the lock lever means 70.

The stopper 92 defines the unlock position of the lock lever means 70 as shown in FIG. 2, and the stopper 80 defines the lock position of the lock lever means 70 as shown in FIG. 5.

The spring 84 is operative to bias the lock lever means 70 in the counterclockwise direction when one end connected to the projection 88 is located rightwardly of an extension of a line connecting the other end connected to the projection 86 and the center of the pin 76 as shown in FIG. 2, and operative to bias the lock lever means 70 in the clockwise direction when the one end is located leftwardly of the extension as shown in FIG. 5. Thus, the spring 84 cooperates with the stoppers 92 and 80 to perform the function of resiliently holding the lock lever means 70 in the unlock and lock positions. The spring 84 has strength which is high enough to hold the pin 82 in its position shown in FIG. 2 when the first rod 20 is moved by the operation lever 12 as the lock lever means 70 is in the unlock position, thereby causing effective movement of the first rod 20 which is transmitted to the pin 50.

The pin 66 has, as shown in FIG. 3, a guide roller 94 rotatably supported thereon, and a guide channel 96 for receiving the guide roller 94 to restrict its movement when the first rod 20 is flexed is secured to an inner surface of the stand 24. The guide channel 96 which has a cross section in the form of a letter U suitable for receiving the guide roller 94 has upper and lower guide surfaces in the form of an arc centered at the lower end of the first rod 20 or the pin 50.

In the lock lever means 70, the hand lever 72 has a relatively large length and is located such that the hand lever 72 is in a position to block a passage 98 for the driver through which he moves in entering or leaving the cab 8 when the lock lever means 70 is in the unlock position as shown in FIGS. 1 and 2 and the hand lever 72 is in a position to open the passage 98 when the lock lever means 70 is in the lock position as shown in FIG. 5.

Operation of the universal lever apparatus of the aforesaid construction will be described.

Movement of the operation lever 12 in the direction X' when the lock lever means 70 is in the unlock position as shown in FIG. 2 causes the block 28 to move in pivotal movement about the pin 34. Owing to the fact that the spring 84 has sufficiently high strength, the pivotal movement of the block 28 enables the first rod 20 or the rod section 58, pin 66 and rod section 60 to perform effective movement in the vertical direction. This makes the lever 48 connected to the rod 60 through the pin 50 to move in pivotal movement thereby to move the rod 52 through the pin 54 to actuate one operated member, not shown.

Referring to FIG. 3, movement of the operation lever 12 in the Y—Y' direction causes the block 28 to move in pivotal movement about the pin 32, thereby to move the second rod 22 in the vertical direction and actuate another operated member, not shown. Thus, by moving the operation lever 12 in two directions or X—X' and Y—Y' directions, it is possible to actuate two operated members, separately.

When the operation lever 12 is not manipulated, it can be locked as follows. The hand lever 72 is manipulated to move the lock lever means 70 in the direction of an arrow A in FIG. 2 against the biasing force of the spring 84. At this time, the lock lever means 70 is pivotally moved about the pin 76, and this pivotally moves the extending portion 74 and the pin 82 about the pin 76, to pull the link 68 leftwardly in FIG. 2 and at the same time to pull the pin 66 and the roller 94 leftwardly thereby to bring the roller 94 into engagement in the channel 96. The roller 94 moves in rolling movement in the channel 96. Since the channel 96 is in the form of an arc centered at the pin 50, the pin 50 does not move vertically and the operated member connected to the rod 52 does not move. Stated differently, the first rod 20 is merely flexed and causes no effective movement to be produced. If the lock lever means 70 is pivotally moved fully until the extending portion 74 is brought into engagement with the stopper 80 on the stand 24, the movement of the lock lever means 70 stops as the extending portion 74 abuts the stopper 80, as shown in FIG. 5. The parts of the lock lever mechanism are dimensioned such that at this time a line connecting the center of the pin 82 and the center of the pin 66 is disposed leftwardly of a line connecting the center of the pin 82 and the center of the pin 76 as shown in FIG. 5 or becomes over-center. Also, at this time, the operation lever 12 is pivotally moved in the first direction X' as the movement of the link 68 caused by the pivotal movement of the extending portion 74 causes the first rod 20 to flex and causes the block 28 to pivotally move about the pin 34, so that the operation lever 12 is displaced to a rearward position as shown in FIG. 5 in which it is disposed in the slot 73 of the guide plate 71. During this operation, the second rod 22 is disposed coaxially with the pin 34, so that the operation lever 12 is kept from moving in the Y—Y' direction.

Thus, it will be understood that the pivotal connection means 62, 64 and 66, link 68, lock lever means 70 and guide roller 94 constitute manually operated means operatively connected to the operation lever 12 for pivotally moving the operation lever 12 to the rearward position in which the operation lever does not interfere with the movement of the driver without causing effective movements of the first and second rods, the manually operated means being movable between the unlock position in which the pivotal movement of the operation lever 12 causes the effective movements of the first rod 20 and the second rod 22 and the lock position in which the operation lever 12 is disposed in the rearward position.

The operation lever 12 which is located in the slot 73 of the guide plate 71 when shifted to the rearward position is kept in the locked condition as it is restrained from moving in the aforesaid directions Y—Y' and in the direction X' indicated by the arrow B in FIG. 5 by an edge of the slot 73. The movement of the operation lever 12 in the direction X indicated by an arrow C is regulated as follows. Assume that the operation lever 12 is desired to be returned in the direction of the arrow C when the operation lever 12 is in the position shown in FIG. 5. The rod section 58 would be moved upwardly through the block 28 and consequently the pin 82 would also be moved upwardly through the pin 66 and the link 68. The force causing these movements to occur would tend to cause the extending portion 74 to pivotally move in the clockwise direction in FIG. 5 because the line connecting the pins 82 and 66 becomes over-center with respect to the line connecting the pins 82 and 76 together. However, the extending portion 74 is in abutting engagement with the stopper 80, so that it could not move in the clockwise direction and consequently the operation lever 12 is unable to pivotally move in the direction C. Thus, it will be understood that the slot 73 of the guide plate 71 and the stopper 80 secured to the stand 24 constitute means for restraining the operation lever 12 from pivotally moving in the first and second directions or in the X—X' and Y—Y' directions when the manually operated means 62–70 is in the lock position and the operation lever 12 is in the rearward position. As described hereinabove, when the operation lever 12 is not manipulated, the operation lever 12 can be shifted to the rearward position in which it does not interfere with the movement of the driver and locked in such position against movement in the X—X' and Y—Y' directions by manually moving the lock lever means 70 to the lock position.

When it is desired to return the operation lever 12 to the position shown in FIG. 2 in which it is located in normal operation condition, the end can be attained by performing the aforesaid process in reverse. That is, the lock lever means 70 is pivotally moved in a direction indicated by an arrow D in FIG. 5 to move the pin 82 in the counterclockwise direction. This results in that a projecting free end 83 of the pin 82 moves the rod section 60 in the clockwise direction, so that the link 68 moves rightwardly in FIG. 5 and the guide roller 94 moves rightwardly in rolling movement in the figure while having its movement regulated by the guide channel 96. This moves the rod section 58 upwardly and pivotally moves the block 28, thereby to pivotally move the operation lever 12 in the direction C until it is restored to the unlock position shown in FIG. 2. In this process, the pin 50 and the second rod 22 are not moved, so that the operated members connected to the rod 52 and the second rod 22 are prevented from being actuated.

In the unlock position, the hand lever 72 of the lock lever means 70 is disposed in a position to block the passage 98 of the driver through which he moves in entering or leaving the cab 8. Thus, when the driver wishes to leave his seat 10 and get out of the cab 8, he cannot freely move through the passage 98 unless he brings the hand lever 72 to the lock position. Thus, he will surely manipulate the manual lever 72 to bring it to the lock position, thereby improving the safety of operation.

From the foregoing description, it will be appreciated that in the universal lever apparatus according to the invention, the lock means for the operation lever comprises manually operated means for pivotally moving the operation lever to its rearward position in which it does not interfere with the movement of the driver, and means for restraining the operation lever in the rearward position for preventing its movement therefrom, and therefore it is made possible to lock the operation lever in a position in which it does not interfere with the movement of the driver when the operation lever is not manipulated or when the driver leaves or enters his cab, for example, thereby allowing the driver to move nimbly and making it possible to avoid any trouble that might otherwise occur when the driver inadvertently touches the operation lever, thereby improving safety in operation.

It will be also appreciated that in the universal lever apparatus according to the invention, the hand lever of the lock means is disposed such that the hand lever is in a position to block the passage of the driver through which he moves in entering or leaving the cab when the lock means is in the unlock position and the hand lever is in a position to open the passage when the lock means is in the lock position, and therefor the presence of the hand lever would naturally compel the driver to move the lock means to the lock position when he desires to leave the cab, thereby improving safety by positively preventing the lock means from being left in unlock position through carlessness.

What is claimed is:

1. A universal lever apparatus comprising a first rod and a second rod each for actuating an operated member, an operation lever connected to the first rod and the second rod and pivotally movable in a first direction for moving the first rod and in a second direction for moving the second rod, and lock means for locking the operation lever, said lock means comprising:

manually operated means operatively connected to the operation lever for pivotally moving the operation lever to a rearward position in which the operation lever does not interfere with movement of a driver without causing effective movements of the first and second rods, said manually operated means being movable between an unlock position in which the pivotal movement of the operation lever causes the effective movements of the first and the second rods and a lock position in which the operation lever is located in the rearward position;

means associated with said manually operated means for resiliently holding said manually operated means in said unlock position and the lock position; and means for restraining the operation lever to keep same from pivotally moving in the first and second directions when said manually operated means is in said lock position and the operation lever is in said rearward position.

2. A universal lever apparatus as claimed in claim 1, wherein said manually operated means comprises:

pivotal connection means flexingly dividing the first rod into rod sections;

a link means pivotally connected to the pivotal connection means; and manually operated lock lever means mounted for pivotal movement and pivotally connected to the link means;

the first rod being flexed at the pivotal connection means through the link means to pivotally move the operation lever in the first direction toward said restraining means, when said lock lever means is pivotally moved from the unlock position to the lock position.

3. A universal lever apparatus as claimed in claim 2, wherein said manually operated means further comprises:

a guide roller rotatably supported by said pivotal connection means; and a guide channel mounted for receiving the guide roller to regulate its movement when the first rod is flexed.

4. A universal lever apparatus as claimed in claim 3, wherein said guide channel is in the form of an arc centered at an output end of the first rod.

5. A universal lever apparatus as claimed in claim 2, wherein said manually operated means comprises a first stopper and a second stopper secured to a shell stand of the apparatus for defining said unlock position and lock position of said lock lever means respectively, and said restraining means comprises said second stopper and an engaging slot formed in a guide plate secured to the shell stand.

6. A universal lever apparatus as claimed in claim 5, wherein said lock lever means comprises a hand lever, an extending portion pivotally connected at one end thereof to said link means, and a pin pivotally supported by the shell stand, said pin rigidly connecting together said hand lever at a base thereof and said extending portion at the other end thereof, said hand lever being engageable with said first stopper and said extending portion being engageable with said second stopper.

7. A universal lever apparatus as claimed in claim 2, wherein said means for resiliently holding said manually operated means comprises coil spring means mounted between said lock lever means and a shell stand of the apparatus, said coil spring means having strength high enough to enable said first rod to move in effective movement when said lock lever means is in said unlock position.

8. A universal lever apparatus as claimed in claim 1, wherein said manually operated means comprises a hand lever, said hand lever being disposed such that the hand lever is in a position to block a passage of the driver through which he moves in entering or leaving a cab when the manually operated means is in the unlock position and the hand lever is in a position to open said passage when the manually operated means is in the lock position.

9. A universal lever apparatus as claimed in claim 2, wherein said lock lever means comprises a hand lever, said hand lever being disposed such that the hand lever is in a position to block a passage of the driver through which he moves in entering or leaving a cab when the manually operated means is in the unlock position and the hand lever is in a position to open said passage when the manually operated means is in the lock position.

10. A universal lever apparatus as claimed in claim 6, wherein said hand lever is disposed such that the hand lever is in a position to block a passage of the driver through which he moves in entering or leaving a cab when the manually operated means is in the unlock position and the hand lever is in a position to open said passage when the manually operated means is in the lock position.

* * * * *